(12) United States Patent
Garmire et al.

(10) Patent No.: US 7,181,637 B2
(45) Date of Patent: Feb. 20, 2007

(54) PACKET PROCESSING SYSTEM AND METHOD FOR A DATA TRANSFER NODE WITH TIME-LIMITED PACKET BUFFERING IN A CENTRAL QUEUE

(75) Inventors: Derrick L. Garmire, Kingston, NY (US); Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/725,784

(22) Filed: Dec. 2, 2003

(65) Prior Publication Data

US 2005/0120257 A1 Jun. 2, 2005

(51) Int. Cl.
*G06F 1/00* (2006.01)

(52) U.S. Cl. ............... 713/500; 713/501; 713/502

(58) Field of Classification Search ......... 713/400, 713/500, 501, 502; 370/235, 229
See application file for complete search history.

(56) References Cited

U.S. PATENT DOCUMENTS

| | | | | |
|---|---|---|---|---|
| 5,086,428 A | * | 2/1992 | Perlman et al. | 370/394 |
| 5,089,957 A | | 2/1992 | Stultz et al. | 395/425 |
| 5,097,428 A | | 3/1992 | Crosby | 364/554 |
| 5,247,517 A | * | 9/1993 | Ross et al. | 370/452 |
| 5,347,272 A | * | 9/1994 | Ota | 370/392 |
| 5,513,134 A | | 4/1996 | Cooperman et al. | 365/49 |
| 5,659,720 A | * | 8/1997 | Fiacco et al. | 713/502 |
| 6,141,785 A | * | 10/2000 | Hur et al. | 714/748 |
| 6,246,690 B1 | | 6/2001 | DiPlacido et al. | 370/408 |
| 7,031,259 B1 | * | 4/2006 | Guttman et al. | 370/235 |
| 2002/0075873 A1 | | 6/2002 | Lindhorst-Ko et al. | 370/394 |
| 2002/0152306 A1 | | 10/2002 | Tuck, III | 709/224 |
| 2003/0016688 A1 | | 1/2003 | Hoof | 370/417 |
| 2003/0035422 A1 | | 2/2003 | Hill | 370/389 |
| 2003/0046414 A1 | | 3/2003 | Pettyjohn et al. | 709/230 |

FOREIGN PATENT DOCUMENTS

| EP | 0 544 454 A2 | 11/1992 |
|---|---|---|
| WO | WO 00/33092 | 6/2000 |
| WO | WO/02/098153 A1 | 12/2002 |

* cited by examiner

*Primary Examiner*—Thomas Lee
*Assistant Examiner*—Malcolm Cribbs
(74) *Attorney, Agent, or Firm*—John E. Campbell; Heslin Rothenberg Farley & Mesiti, P.C.

(57) ABSTRACT

A method and system are provided for processing data packets at a data-transfer network node. The method and system include determining a length of time that a packet has been buffered at the node by associating a timer with each data packet received and buffered in the node's central queue. The central queue subsequently reads the associated timer to determine a length of time that a data packet has been buffered prior to the data packet being transmitted by the node. If a packet has been buffered too long, then the queue discards the packet. Otherwise, the queue permits transmission of the packet. The amount of circuitry in the switching node's central queue is reduced by locating the packet timers in timer logic external to the queue.

24 Claims, 7 Drawing Sheets

PACKET PROCESSING SYSTEM AND METHOD FOR A DATA TRANSFER NODE WITH TIME-LIMITED PACKET BUFFERING IN A CENTRAL QUEUE

TECHNICAL FIELD

This invention relates, in general, to processing data packets at a network switching node, and more particularly, to techniques for tracking a length of time that a data packet has been buffered at the network switching node.

BACKGROUND OF THE INVENTION

Congestion in a packet data transfer network can cause packets to remain buffered in a switch for a longer period of time than is desired for efficient network operation. As a result, certain network communications protocols require switches to discard data packets that cannot be transmitted by a switch within a specified period of time. This requires the network switch to track how long data packets have been buffered within the switch. Conventionally, this tracking is accomplished using time stamps.

SUMMARY OF THE INVENTION

The shortcomings of the prior art are overcome and additional advantages are provided through the provision of a method of processing a data packet for a node of a data transfer network. This method associates a timer with each data packet received and buffered in the node's central queue so that the length of time that a data packet has been buffered can be readily determined prior to the data packet being transmitted by the node. If a packet has been buffered too long, the queue discards the packet. Otherwise, the queue permits transmission of the packet. Advantageously, these packet timers are located external to the node's queue so that the processing load within the queue is decreased.

Another advantage of the present invention is that the packet timers approximately measure an interval of time directly. Each packet timer is set to an initial state when a data packet is received in the central queue, and the timer's state is advanced periodically. The timer's state transition sequence is such that once the timer reaches a target state, which approximately measures the desired maximum packet buffering time, the packet timer remains in the target state until it is reset by the central queue. Therefore, packet processing in the central queue is simplified because there is no need to compute the elapsed time between timestamps. The expiration of a packet timer is simply determined by inspection of the timer's state. Examples of network nodes in which concepts of the present invention may be used include switches, routers, and network adapters.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a technique for time tracking packets at a data transfer node. The technique includes (in one embodiment) associating a timer with each data packet received and buffered at the node's central queue. Each timer measures the length of time that the associated data packet has been buffered at the node's queue. The queue queries the timer associated with a data packet when the node is ready to transmit the packet. If the packet has been buffered in the queue too long, the queue discards it. Otherwise, the queue permits transmission of the packet by the node.

Figure 1:
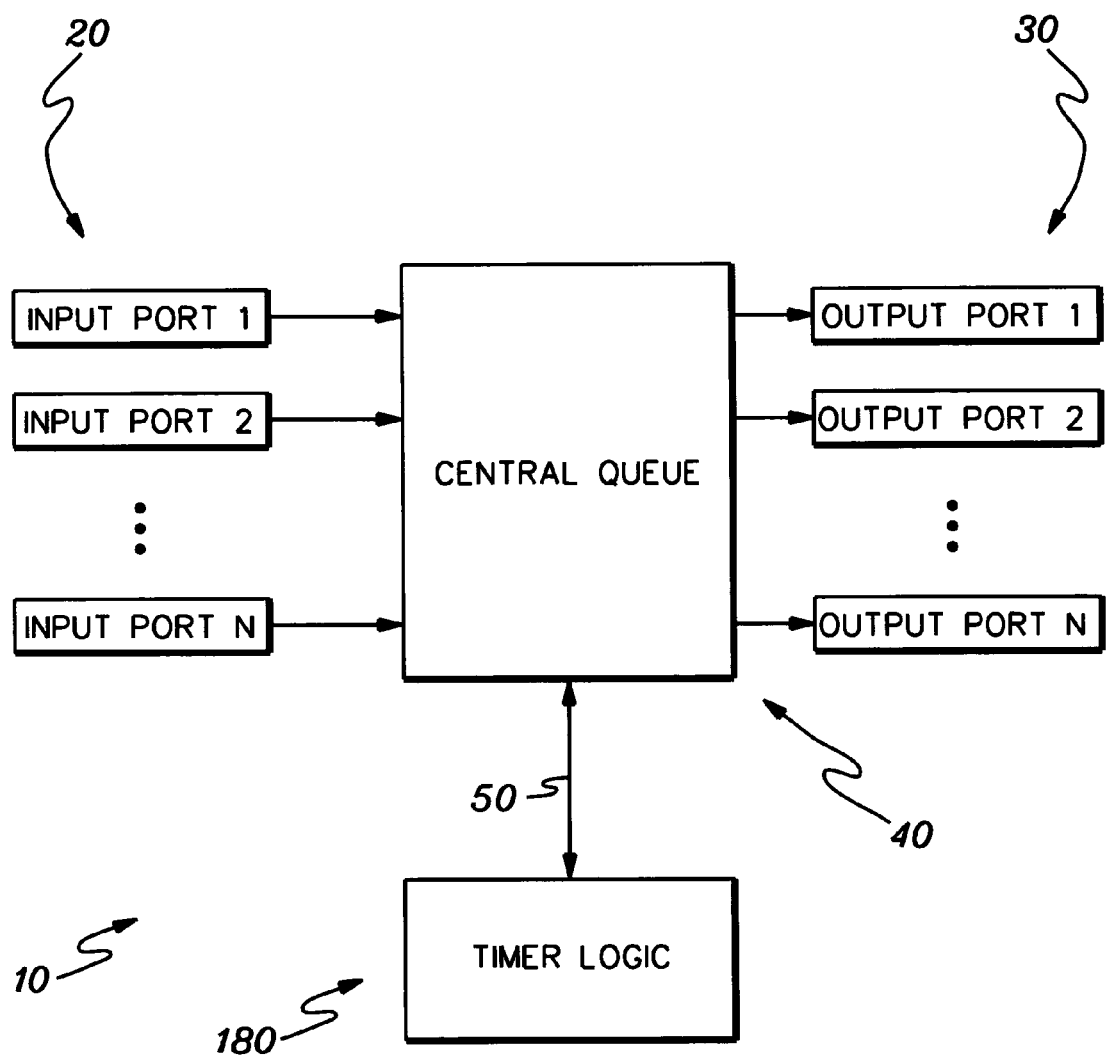
FIG. 1 illustrates one embodiment of a multi-port switch, in accordance with an aspect of the present invention.

One embodiment of a switch 10 incorporating and using one or more aspects of the present invention is depicted in FIG. 1. Switch 10 includes multiple input ports 20, multiple output ports 30, a central queue 40, and a timer logic 180. Input ports 20 and output ports 30 are connected to the central queue to facilitate buffering of data packets received by the input ports 20 and transmitting of buffered data packets through output ports 30.

In one embodiment of switch 10, incorporating and using one or more aspects of the present invention, central queue 40 is also connected to timer logic 180. This connection is via an interface bus 50 over which central queue 40 and timer logic 180 exchange control and data signals in order to measure the length of time that data packets are stored in the central queue 40.

Figure 2:
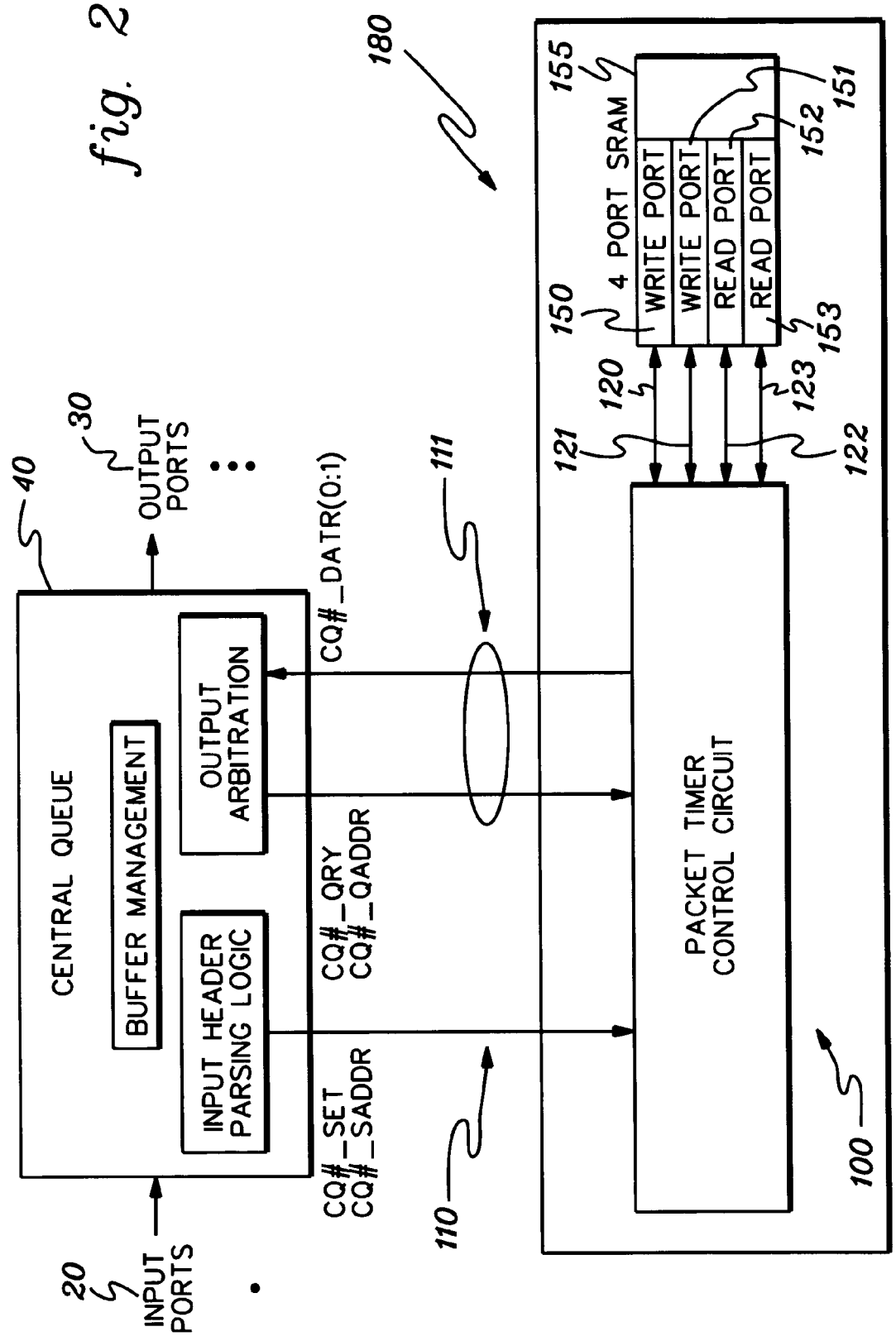
FIG. 2 is a detailed block diagram of one embodiment of the interfaces between the central queue and timer logic of FIG. 1, in accordance with an aspect of the present invention.

FIG. 2 illustrates several features of central queue 40, timer logic 180, and interface bus 50, in accordance with aspects of the present invention.

In this example, interface bus 50 includes two interfaces 110 and 111 disposed between central queue 40 and timer logic 180. These interfaces support interleaved packet processing in central queue 40. Timer logic 180 includes a packet timer control circuit 100, which exchanges a plurality of control and data signals with a multi-port memory 155 via control/data buses 120–123. As one example, multi-port memory 155 can comprise a four-port static random access memory (SRAM) with two read and two write ports. Packet timer control circuit 100 communicates with write ports 150 and 151 of multi-port memory 155 via control/data buses 120 and 121, respectively, and communicates with read ports 152 and 153 via control/data buses 122 and 123, respectively. As explained further below, multi-port memory 155 stores the states of the timers that measure the length of time that data packets have been buffered in the central queue 40.

Operationally, when a packet is received by one port of input ports 20 and placed into central queue 40, central queue (CQ) 40 signals to packet timer control circuit (PTCC) 100 to set a counter for that packet. In one embodiment, interface 110 carries signals CQ#_SET and CQ#_SADDR to effectuate this signaling, where the # symbol can be the number 0 or 1. In this embodiment, central queue 40 can set timers for two packets simultaneously by sending both pairs of signals, i.e. CQ0_SET and CQ0_SADDR and CQ1_SET and CQ1_13SADDR, simultaneously on interface 110.

When central queue 40 is ready to transmit a data packet, it queries the timer logic 180 to obtain the state of the timer associated with that packet. As illustrated in FIG. 2, this function can comprise central queue 40 and timer logic 180 exchanging signals CQ#_QRY, CQ#_QADDR, and CQ#_DATR(0:1) on interface 111, where the # symbol can be the number 0 or 1. In one embodiment, signals CQ#_QRY are query enable signals; CQ#_QADDR identify packet timers to query; and signals CQ#_DATR(0:1) are the states of the queried timers provided by timer logic 180 in response to the central queue's requests. As with setting the timers, central queue 40 can obtain the states of two timers simultaneously by exchanging both groups of signals at once. The central queue 40 maintains the association between a buffered data packet and its timer.

Once central queue 40 has obtained the state of a packet's timer as a result of a query, it performs one of two functions based on the state of the timer: if the state is equal to the target state, for example state 00, then the central queue begins an operation to discard the associated data packet; otherwise, the central queue 40 retains the state of that timer and performs any subsequent advancements of that timer's state itself until the packet has either timed out or is ultimately transmitted. In the former case, the central queue 40 does not query that timer again because the packet is no longer valid. Consequently, central queue 40 merely sets that timer again when the associated buffer location in the central queue is used to store another received data packet.

The state of a timer indicates the approximate length of time that the associated packet has been at the switch node. After central queue 40 sets an initial state for the timer associated with a received data packet, timer logic 180 approximately periodically advances the states of the timers for all buffered packets. For example, a timer state of 00 might indicate that the associated packet has timed out and should be discarded; whereas a state of 10 might be an initial state of the timer, indicating that the timer can be advanced twice before the packet timer expires. In other words, in one example, a timer's state sequence is 10, 01, 00. Also, those skilled in the art will recognize that the packet timeout interval can be programmable, and/or set to any appropriate length dependent on the implementation.

Figure 3:
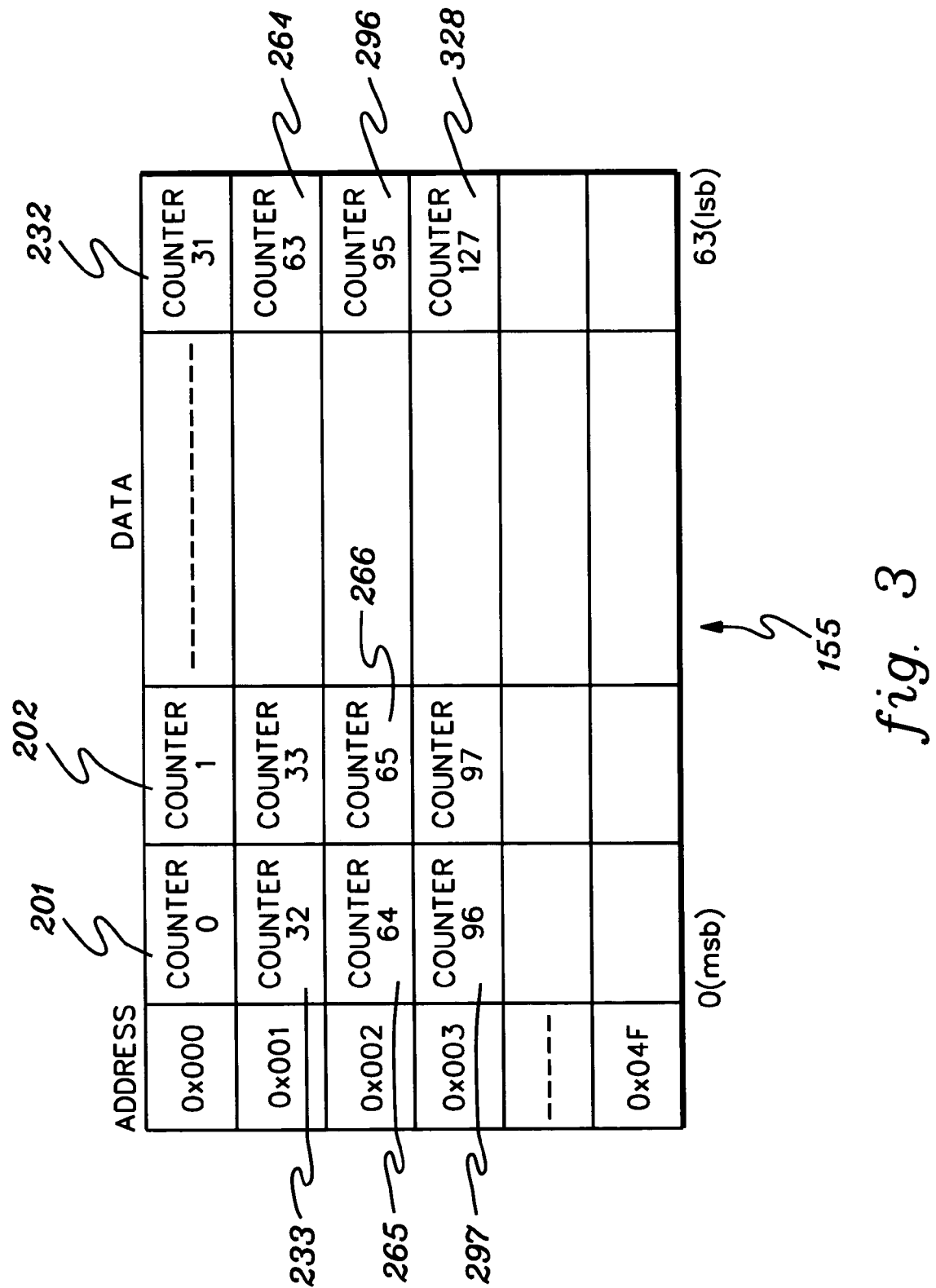
FIG. 3 illustrates an example of the organization of the timer logic's memory, in accordance with an aspect of the present invention.

In one embodiment, organization of multi-port memory 155 is such that the states of more than one timer are stored in one address (e.g., row) of the memory. FIG. 3 shows multi-port memory 155 having eighty addresses (or rows), and each address (or row) contains thirty-two 2-bit timer states.

As one example, multi-port memory 155 can be a 4-port static random access memory (SRAM), with each timer being a counter location (e.g. 201 in FIG. 3) in the array. There is a one-to-one mapping between each 2-bit counter and each packet. Packets are identified by their addresses in the SRAM. There are 2560 counters in one embodiment so that the SRAM has 80 addresses (2560 counters, with 32 counters/address). Since the SRAM has two read ports and two write ports, and since each counter is two bits wide in one embodiment, it is possible to read and write 64 counters per clock cycle. Therefore, all the counters can be updated in 40 clock cycles (2560 counters/64 counters/clock cycle).

Figure 4:
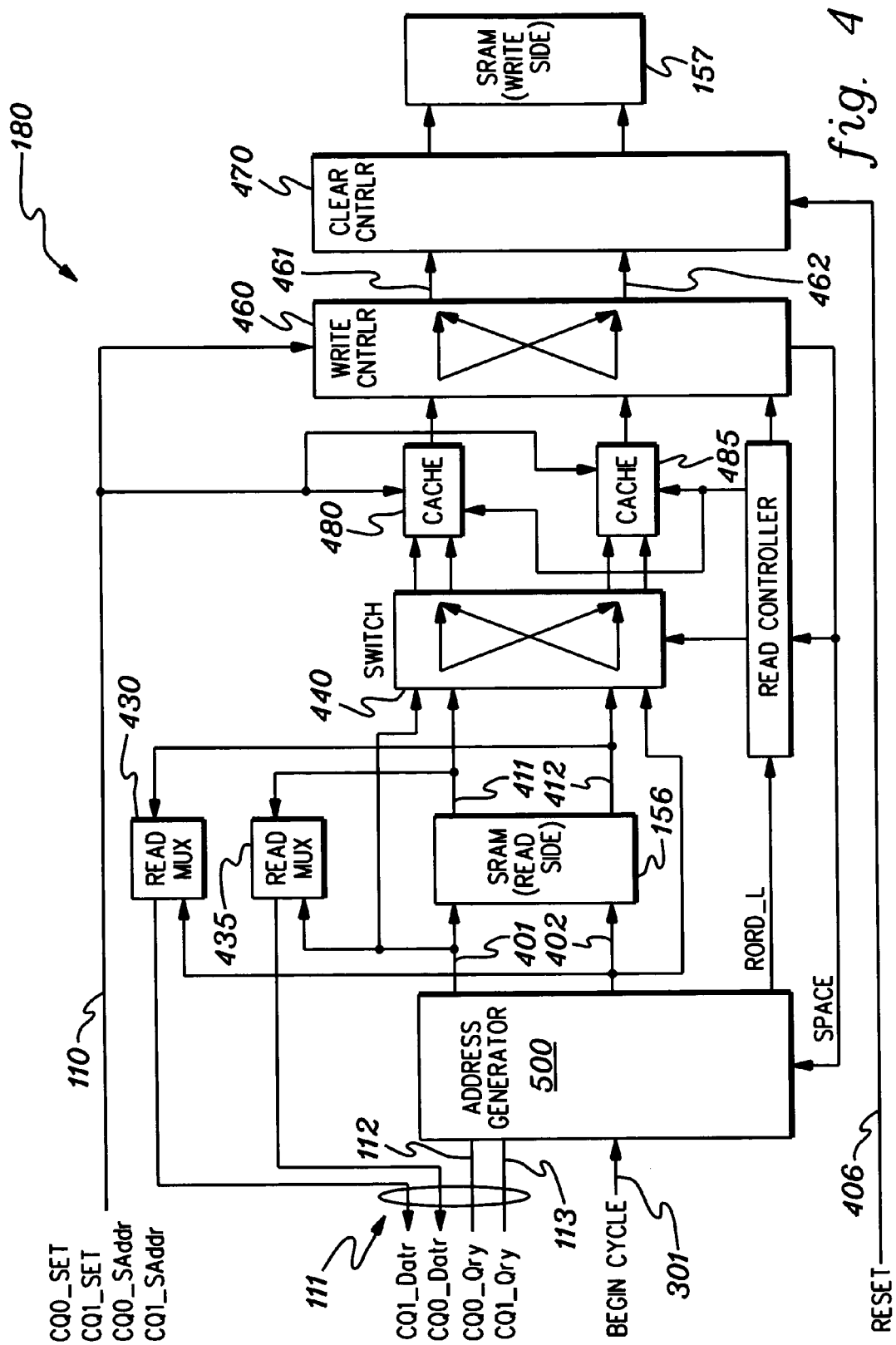
FIG. 4 illustrates a detailed embodiment of the timer logic of FIGS. 1 and 2, in accordance with an aspect of the present invention.

Setting a timer to an initial state is further described below with reference to FIG. 4, which illustrates one detailed embodiment of timer logic 180. As discussed above, operationally the central queue signals to packet timer control circuit 100 (FIG. 2) to set a counter for a received data packet (in one embodiment) by placing signals CQ0_SET and CQ0_SADDR or CQ1_SET and CQ1_SADDR on interface 110. Each of the signals CQ#_SET is a request to a write controller 460 (FIG. 4) to set a timer to a predetermined initial value, and each of the signals CQ#_SADDR identifies which timer is to be set. Write controller 460 interfaces to a SRAM (write side) 157 through a clear controller 470. SRAM (write side) 157 comprises write ports 150 and 151 of multi-port memory 155 (see FIG. 2).

If there is no request (a CQ#_QRY signal on interface 111) from central queue 40 to read the state of a timer, and packet timer control circuit 100 is enabled (i.e. BeginCycle 301 has previously been asserted, and all the timers have not yet been decremented), an address generator 500 sequentially generates addresses of memory locations of multi-port memory 155 where states of packet timers are stored. Since up to two different addresses can be generated in one clock cycle (in one example), the states of packet timers stored in two memory locations can be read on buses 411 and 412 at the same time from an SRAM (read side) 156, comprising read ports 152 and 153 of multi-port memory 155 (see FIG. 2), by placing their addresses on buses 401 and 402. These timer states are passed to write controller 460 via a switch 440 and caches 480 and 485. Write controller 460 advances the states of the timers and writes the advanced states back into the appropriate memory locations in the multi-port memory 155 (FIG. 2) via clear controller 470 and SRAM (write side) 157. Once packet timer control circuit 100 (FIG. 2) advances the states of all counters stored in the multi-port memory, the state advancing function of packet timer control circuit 100 idles until the next update period.

Determining the length of time that a packet has been buffered in central queue 40 is next described. Central queue 40 queries timer logic 180 by asserting a CQ#_QRY signal on interface 111, indicating which timer the queue wishes to read. This query is given priority over the periodic advancing of the timers' states by packet timer control circuit 100 (FIG. 2). The state of the requested timer is provided to central queue 40 from multi-port memory 155 (FIG. 2) via SRAM (read side) 156 (FIG. 4) and one of read multiplexers 430 and 435 in the next clock cycle. Multiplexer 435 is used if the query is made on line 112, and multiplexer 430 is used if the query is made on line 113.

As discussed with regard to one example above, packet timer control circuit 100 (FIG. 2) accesses 32 counters (64 bits) per port at once when it reads from and writes to the 4-port SRAM. As a result, when advancing the states of all timers, packet timer control circuit 100 reads the states of timers stored in a row substantially simultaneously as a group, advances each state in the group substantially simultaneously, and writes the newly advanced states in this group of timers back to memory substantially simultaneously. In contrast, central queue 40 only accesses one 2-bit counter per port, at once. This gives the packet timer control circuit 100 a performance advantage that is exploited in this invention.

Packet timer control circuit 100 can also substantially simultaneously utilize multiple memory read ports if not concurrently being used to provide a timer state to the central queue. This feature further reduces the time required to advance the timers' states. If the interval during which the timer states have to be advanced is long compared to the time it takes to access and advance all the timers, then the timer manipulations will consume a very small portion of the central queue bandwidth into multi-port memory 155.

For example, if a packet timer is set to 1 millisecond, and it only takes 40 clock cycles to advance all of the timers ((2560 timers/32 timers per cycle)/(2 ports at a time) ), then only 160 nsec of the 0.5 millisecond is used (0.032%) at a 4 nsec clock cycle time. The period 0.5 millisecond is used because the packet timer control circuit 100 updates all timer states twice within the maximum packet buffering time. This is desirable when the granularity of the packet timeout is +5%/−55%. To achieve a −55% tolerance for packet timeout in this embodiment, a minimum of two timer state advances would be necessary. Other timeout tolerances can be obtained with trivial alterations of the number of timer states and the period of the timer state advancement.

Another aspect of the present invention is the way the packet timer control circuit (PTCC) 100 interleaves around central queue (CQ) 40 requests to the memory holding the counters. If the CQ is not making any requests, the PTCC will use both ports of the SRAM. If the CQ is using one port, the PTCC will first try to "piggyback" one of its requests with the CQ request. This is possible when the CQ is accessing one of the 32 counters that the PTCC is accessing. The PTCC can use the other port to access timer states contained in the non-overlapping addresses. Similarly, if the CQ is making two requests, the PTCC tries the same approach to overlay both of its requests with the CQ requests. Only when the CQ requests to access two counters simultaneously that are not within the two groups of counter values that the PTCC is seeking can the PTCC circuit get locked out. This would not happen for long periods of time, since accessing the counter is associated with accessing the packet header. In a packet with a significant amount of data, the header makes up a small percentage of the data in the packet.

This aspect of the present invention is further explained with reference to FIGS. 2 and 3 and the following example. If the CQ is trying to read counter 202 while the PTCC logic is reading counters 201–264, instead of dedicating the PTCC request to read counters 201–232 to one SRAM read port and the CQ request to the other SRAM read port, the packet timer control circuit will move its own request to read counters 201–232 to the read port dedicated to the CQ query and reads counters 233–264 on the other SRAM read port. Thus, all 64 counters may still be read in 1 clock cycle instead of 2 clock cycles.

Figure 5:
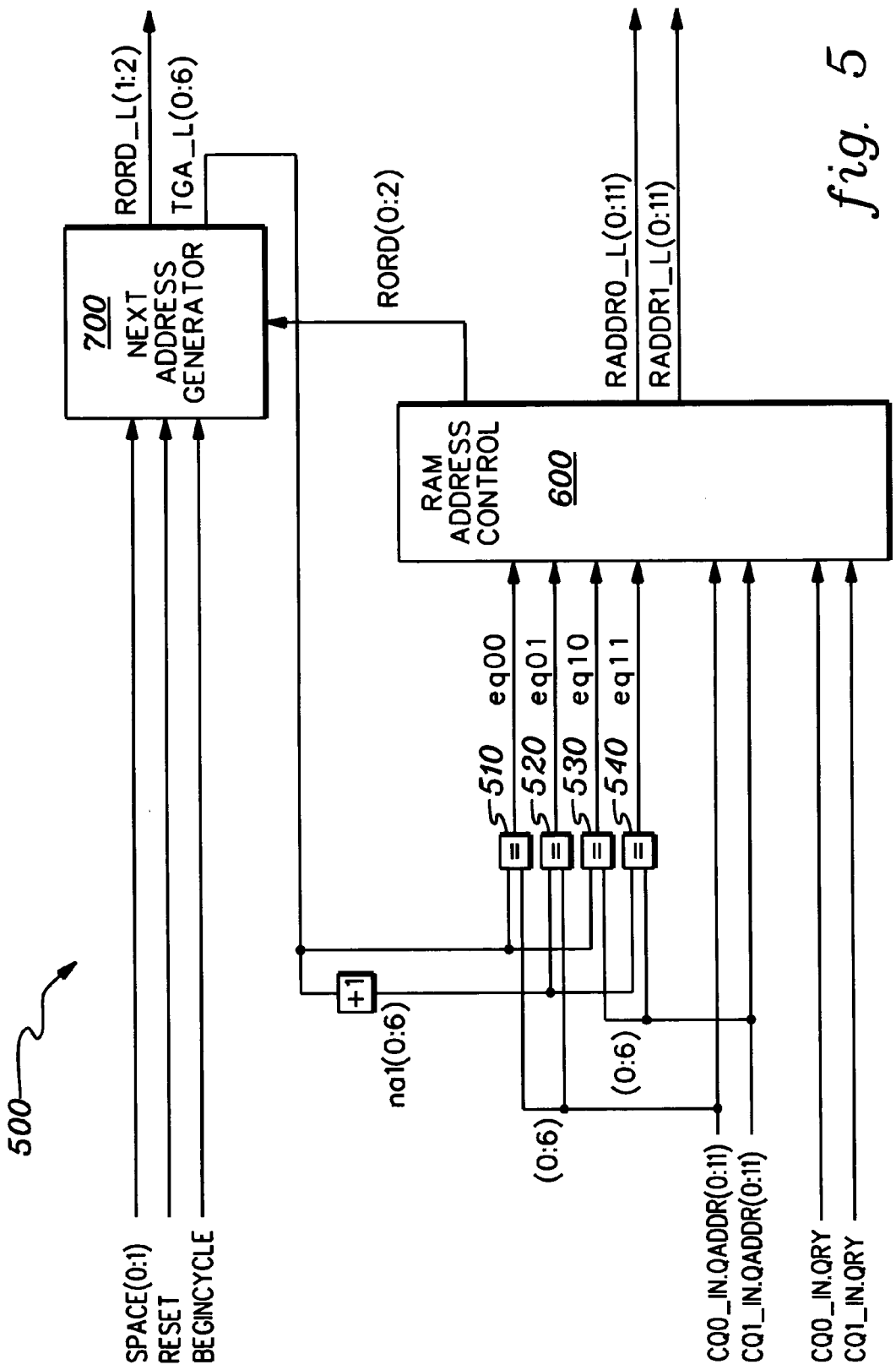
FIG. 5 illustrates one embodiment of the address generator shown in the timer logic embodiment of FIG. 4, in accordance with an aspect of the present invention.
Figure 6:
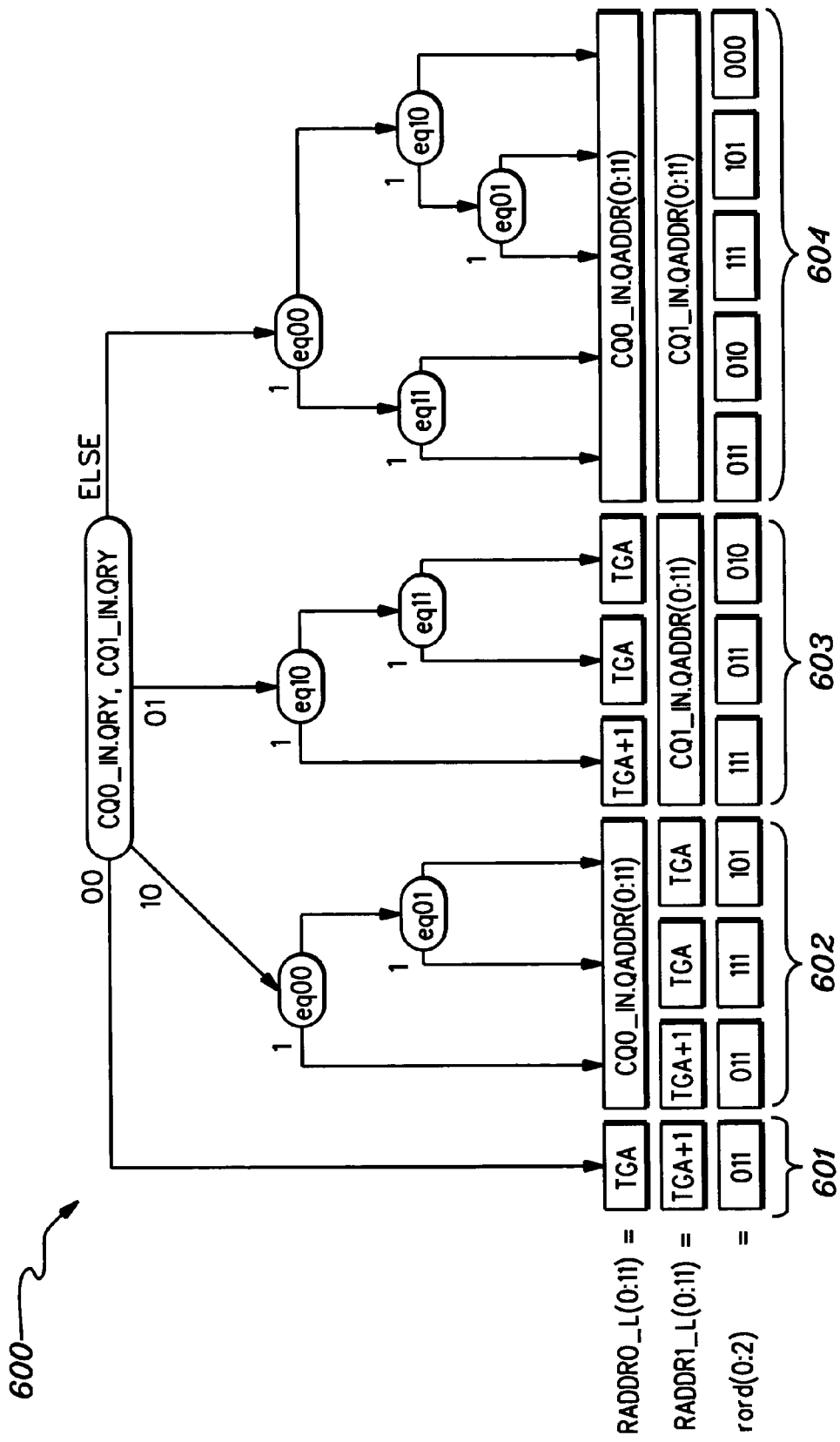
FIG. 6 illustrates one embodiment of the input-output characteristic of the memory address control function of the timer logic's address generator of FIG. 5, in accordance with an aspect of the present invention.

In one embodiment, this function can reside in address generator 500, one embodiment of which is depicted in FIG. 5. In this embodiment, address comparison logic units 510 and 530 compare a first address (TGA_L(0:6)) from next address generator 700 to addresses CQ0_IN.QADDR(0:6) and CQ1_IN.QADDR(0:6), respectively, and address comparison logic units 520 and 540 compare a second address, which is computed from the first address from next address generator 700, to addresses CQ0_IN.QADDR(0:6) and CQ1_IN.QADDR(0:6), respectively. Addresses CQ0_IN.QADDR(0:6) and CQ1_IN.QADDR(0:6) are components of signals CQ0_QRY 112 (FIG. 4) and CQ1_QRY 113 (FIG. 4) shown as being sent on interface 111 (FIG. 4). Signals eq00, eq01, eq10, and eq11 indicate whether the two addresses compared by address comparison logic units 510, 520, 530, and 540, respectively, are the same or different. FIG. 6 illustrates the input-output characteristic function for one embodiment of address control 600. More particularly, FIG. 6 shows the addresses, RADDR0_L(0:11) and RADDR0_L(0:11), generated by RAM address control 600 in response to input signals TGA_L(0:6) and signals eq00, eq01, eq10, and eq11.

Further aspects of advancing of timer states in timer logic 180 (FIG. 2) are described below with reference again to FIG. 4. Address generator 500 sequentially generates addresses of multi-port memory 155 (FIG. 2) which contain the states of the packet timers. In this example, up to two different addresses can be generated in one clock cycle for the purpose of advancing the states of packet timers. The address generator generates addresses on the multi-port memory read ports, which are assumed to be not being used to respond to a request by the central queue to query a packet timer. This results in an entire row of states (32 counters) being presented to switch 440 as a data word from each read port of SRAM (read side) 156. Switch 440 moves both data words to each of cache modules, cache 480 and cache 485, which is not currently holding data to be written to SRAM (write side) 157 of the multi-port memory.

The two caches (480 and 485) form a staging area where data that has been read from the SRAM is held until a write port of SRAM (write side) 157 becomes available. Setting the state of a timer in response to a request by the CQ (because it is receiving a packet) has priority over advancing the states of timers. If the CQ has not requested that a counter be set using a particular write port, that write port is available. For each available write port, write controller 460 takes valid data (e.g., the current value of 32 consecutive counters) from one of the caches, decrements all the counters that are not equal to 00 by one, and then switches the resulting data word to an available write port on the SRAM. This process continues until all the counters in memory have been decremented.

In one embodiment, packet timer control circuit 100 can also have a coherency feature. If the CQ signals to set a counter that the packet timer control circuit has previously read for the purpose of decrementing and is holding it in its cache, then that one counter to be set of the 32 held in a cache will not be re-written into the SRAM. That is, the write-enable bits for the 2 bits comprising that counter will be disabled. Instead, an initial counter state is written to memory for that counter. This can happen if the CQ discards a packet and then reuses the location for a new packet. Both caches (480 and 485) are sensitive to both central queue interfaces.

In another aspect, when packet timer circuit 100 is requested to set an initial timer state for a timer concurrently with advancing timer states that reside in the same row, write controller 460 operates analogously to address generator 500 to merge the two write accesses to a single write port. If the CQ is trying to set a counter and that counter is contained within a group of 32 counters that the PTCC is trying to write, the packet timer control circuit switches its write access over to the bus that the CQ is accessing and just overlays the CQ access onto its own.

For example, if the CQ is trying to set counter 266 and the PTCC is trying to update counters 265–328, the PTCC moves the data for counters 265–296 to the multi-port memory interface (either 461 or 462) that corresponds to the set-function sub-interface on which the CQ made the set request and replaces bits comprising counter 266 with "10" to set an initial state for timer 266. Here a set-function sub-interface is defined as the lines comprising interface 110 which carry one of the following groups of signals: CQ0_SET and CQ0_SAddr or CQ1_SET and CQ1_SAddr. This allows the PTCC to write the data for counters 297–328 on the other SRAM port. By utilizing this memory access method on both read ports (152 and 153) and write ports (150 and 151) in combination with a 2 data word (64 counter) cache, the probability of the PTCC getting access to the SRAM is increased. This increases the overall performance of the packet timer control circuit.

A further feature of packet timer control circuit 100 in accordance with an aspect of the present invention is the functionality of clear controller 470. Clear controller 470 sets the contents of multi-port memory 155 (FIG. 2) to all 0's for initialization via SRAM (write side) 157. When RESET 406 is asserted, clear controller 470 ignores all data coming from the write controller 460 and uses both write ports of SRAM (write side) 157 to write the entire SRAM to all "0".

Figure 7:
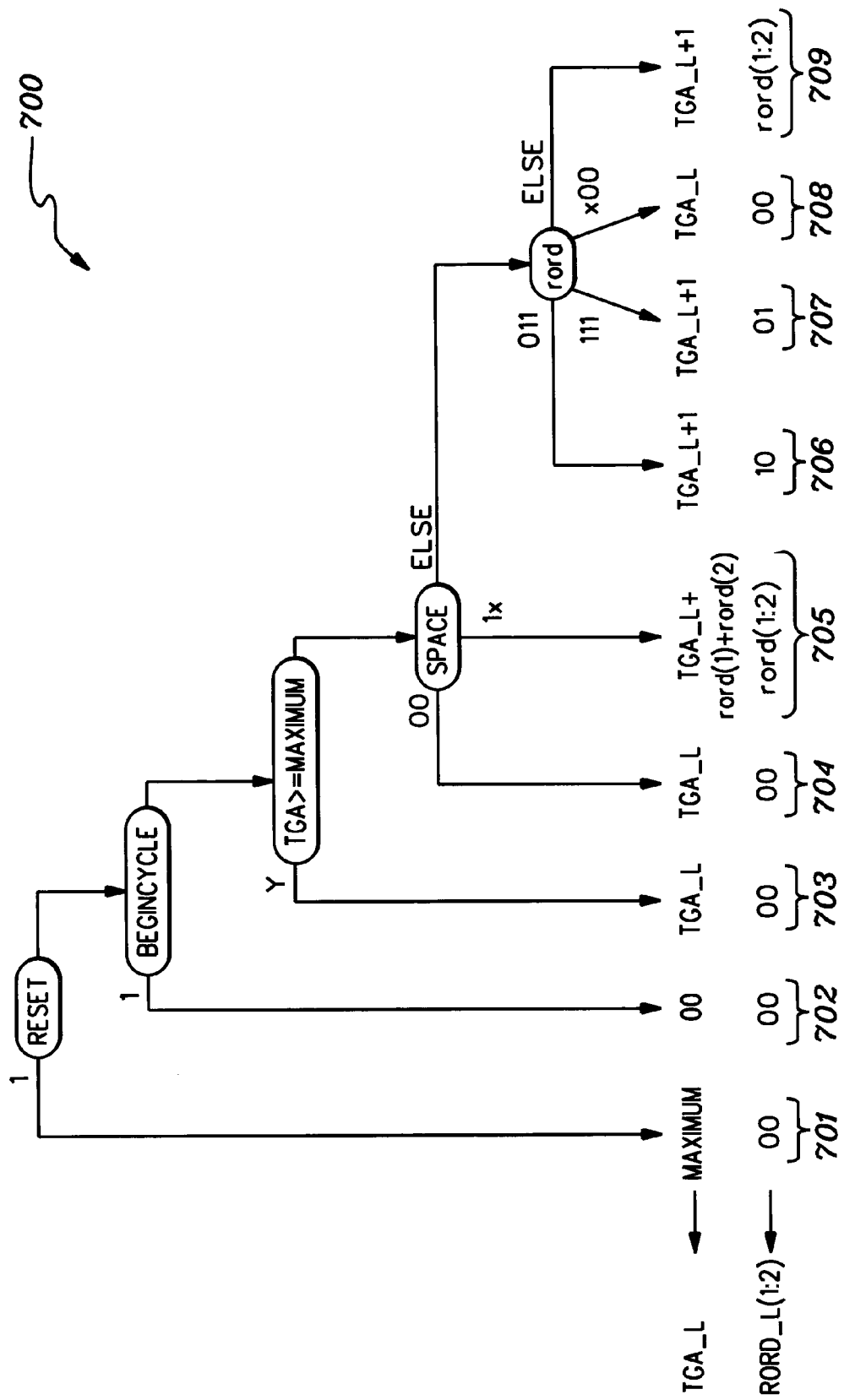
FIG. 7 illustrates one embodiment of the input-output characteristic of the next address generator function of the timer logic's address generator of FIG. 5, in accordance with an aspect of the present invention.

Address generator 500 determines what addresses the packet timer control circuit sends to the read side of the SRAM. It controls both read ports of the SRAM. As noted, one embodiment of address generator 500 is illustrated in FIG. 5, wherein the generator comprises two subunits, RAM address controller 600 and next address generator 700. FIG. 6 illustrates the input-output characteristic function for one embodiment of RAM address controller 600, and FIG. 7 illustrates the input-output characteristic function of next address generator 700, in accordance with aspects of the present invention. The signals illustrated in FIG. 5 are defined in the table below.

| | |
|---|---|
| RESET | (=1) Resets the circuit |
| 1 SPACE(0:1) | Feedback from the Write controller indicating how much space is available to hold data coming from the read port of the RAM. It is decoded:<br>00 : Empty<br>01 : 1 slot free<br>1x : 2 slots free |
| BEGINCYCLE | (=1) Strobe indicating that the PTCC circuit should start generating Addresses. It will start at 0 and run till the maximum address is generated (79) in this implementation. |
| CQ0_IN.QADDR(0:11)<br>CQ1_IN.QADDR(0:11) | The Address the CQ (side0, side1) is requesting. Valid when corresponding CQx_IN.QRY is valid |
| CQ0_IN.QRY<br>CQ1_IN.QRY | CQ Query. See above. |
| rord(0:2)<br>RORD_L(1:2) | Read Ordinal. Indicates to the Write Controller which side read is valid. Also indicates which side contains the lower address. It is decoded:<br>x00 : nothing valid<br>x10: side-0 is valid<br>x01: side-1 is valid<br>011: Both sides are valid, 0-side is lower address<br>111: Both sides are valid, 1-side is lower address<br>After processing by the next address generator, RORD_L(1:2) will be derived from this value. |
| TGA_L(0:6) | Target Generated Address. This address (and possible one plus this address) is the next address the PTCC will try to read. |
| RADDR0_L(0:11)<br>RADDR1_L(0:11) | These are the addresses the PTCC are sending to the read side of the RAM.<br>Note: When TGA moves into RADDRx, only the upper 7 bits are updated. The lower 5 bits, which correspond to a particular counter, are not used by the PTCC ; they only go to the read multiplexers. |

As mentioned above, FIG. 6 illustrates the input-output characteristic function for one embodiment of RAM address controller 600 in accordance with an aspect of the present invention. More particularly, FIG. 6 presents the values of the outputs of RAM address controller 600 arranged by decision branch of the RAM address controller's input-output characteristic function. Decision branch 601 is taken when the central queue (CQ) is idle. As a result, the packet timer control circuit (PTCC) uses both read ports of the 4-port SRAM. If the CQ makes one query, either decision branch 602 or decision branch 603 is taken, depending on whether the query is made on line 112 (FIG. 4) or line 113 (FIG. 4), respectively. In this case, RAM address controller 600 places the address for the CQ's query on the read port corresponding to the line on which the query is made. The RAM address controller also determines whether one of the PTCC's read requests can be "piggybacked" with the CQ's query as described previously. Regardless of this determination, one of the PTCC's read requests is directed to the other read port. When decision branch 604 is followed, the central queue has made two timer queries concurrently. The RAM address controller "piggybacks" one or both of the PTCC's read requests with the CQ's queries if possible.

As mentioned above, FIG. 7 illustrates the input-output characteristic function for one embodiment of next address generator 700 of address generator 500 (FIG. 5) in accordance with an aspect of the present invention. More particularly, FIG. 7 presents the values of the outputs of next address generator 700 arranged by decision branch of the next address generator's input-output characteristic function. Decision branch 701 results when the timer logic is reset. Decision branch 702 is taken when the next address generator is started. If decision branch 703 is taken, the next address generator (NGA) is finished generating addresses. Decision branch 704 is followed when there is no room in the write controller. In this situation, the NGA does nothing. Decision branch 705 is taken when there is room for two data words in the write controller. When only one data word can be written to the write controller, and the PTCC makes two read requests, either decision branch 706 or decision branch 707 is taken in the next address generator's input-output characteristic function, depending on which side of the write controller is available to be written. In this situation, one of the two addresses for the PTCC read requests is placed on the read port connected to the available side of the write controller. Decision branch 708 is taken when there are no PTCC read requests. Decision branch 709 is followed when only one data word can be written to the write controller and the PTCC makes only read request. In this case, the next address generator moves the address for the read request to read port connected to the available side of the write controller.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A packet processing method for a node of a data transfer network, said method comprising:
    associating a separate timer with each data packet received and stored by a central queue of the node, said timer measuring a length of time which said data packet is stored in said central queue and comprising one timer of a plurality of timers disposed in timer logic external to the central queue;
    storing states of said plurality of timers in an array, wherein each timer of said plurality of timers has a state;
    providing said length of time to said central queue when said central queue is ready to transmit said data packet; and
    allowing transmission of said data packet if said length of time is less than a defined target, and preventing transmission of said data packet if said length of time is greater than said defined target.

2. The method of claim 1, further comprising periodically advancing the states of a group of said plurality of timers substantially simultaneously.

3. The method of claim 2, wherein the states of said group of timers comprise one of a row or a column in said array.

4. The method of claim 2, wherein said array is a multi-port array, and wherein said associating further comprises setting substantially simultaneously initial states for the associated timers of multiple data packets in said multi-port array via a plurality of array ports of the multi-port array.

5. The method of claim 2, wherein said array is a multi-port array, and wherein said providing further comprises obtaining substantially simultaneously the states for the associated timers of multiple data packets from said multi-port array via a plurality of array ports of the multi-port array.

6. The method of claim 2, wherein said array is a multi-port array, and said associating further comprises setting an initial state for said timer in said array via array ports of the multi-port array, and said providing further comprises obtaining the state of a timer associated with another data packet via the array ports of the multi-port array, and said periodically advancing further comprises obtaining the states of said group of said plurality of timers substantially simultaneously via the array ports, wherein when said setting, said providing, and said periodically advancing overlap in time, said setting and said providing have higher priority than said periodically advancing with respect to accessing the array ports of the multi-port array.

7. The method of claim 6, wherein said setting is responsive to a set-timer request made by said central queue, and said providing is responsive to a read-timer request made by said central queue.

8. The method of claim 7, wherein said periodically advancing further comprises advancing the states of a subgroup of timers of the group of timers when said set-timer request or said read-timer request concurrently accesses a timer in said group of timers, wherein the concurrently accessed timer is not advanced by said periodically advancing.

9. A packet processing system for a node of a data transfer network, said system comprising:
    means for associating a separate timer with each data packet received and stored by a central queue of the node, said timer measuring a length of time which said data packet is stored in said central queue and comprising one timer of a plurality of timers disposed in timer logic external to the central queue;
    means for storing states of said plurality of timers in an array, wherein each timer of said plurality of timers has a state;
    means for providing said length of time to said central queue when said central queue is ready to transmit said data packet; and
    means for allowing transmission of said data packet if said length of time is less than a defined target, and preventing transmission of said data packet if said length of time is greater than said defined target.

10. The system of claim 9, further comprising means for periodically advancing the states of a group of said plurality of timers substantially simultaneously.

11. The system of claim 10, wherein the states of said group of timers comprise one of a row or a column in said array.

12. The system of claim 10, wherein said array is a multi-port array, and wherein said means for associating further comprises means for setting substantially simultaneously initial states for the associated timers of multiple data packets in said multi-port array via a plurality of array ports of the multi-port array.

13. The system of claim 10, wherein said array is a multi-port array, and wherein said means for providing further comprises means for obtaining substantially simultaneously the states for the associated timers of multiple data packets from said multi-port array via a plurality of array ports of the multi-port array.

14. The system of claim 10, wherein said array is a multi-port array, and said means for associating further comprises means for setting an initial state for said timer in said array via array ports of the multi-port array, and said means for providing further comprises means for obtaining the state of a timer associated with another data packet via the array ports of the multi-port array, and said means for periodically advancing further comprises means for obtaining the states of said group of said plurality of timers substantially simultaneously via the array ports, wherein when said means for setting, said means for providing, and said means for periodically advancing overlap in time, said means for setting and said means for providing have higher priority than said means for periodically advancing with respect to accessing the array ports of the multi-port array.

15. The system of claim 14, wherein said means for setting is responsive to a set-timer request made by said central queue, and said means for providing is responsive to a read-timer request made by said central queue.

16. The system of claim 15, wherein said means for periodically advancing further comprises means for advancing the states of a subgroup of timers of the group of timers when said set-timer request or said read-timer request concurrently accesses a timer in said group of timers, wherein the concurrently accessed timer is not advanced by said means for periodically advancing.

17. At least one program storage device readable by a machine embodying at least one program of instructions executable by the machine to perform a packet processing method for a node of a data transfer network, said method comprising:
   associating a separate timer with each data packet received and stored by a central queue of the node, said timer measuring a length of time which said data packet is stored in said central queue and comprising one timer of a plurality of timers disposed in timer logic external to the central queue;
   storing states of said plurality of timers in an array, wherein each timer of said plurality of timers has a state;
   providing said length of time to said central queue when said central queue is ready to transmit said data packet; and
   allowing transmission of said data packet if said length of time is less than a defined target, and preventing transmission of said data packet if said length of time is greater than said defined target.

18. The at least one program storage device of claim 17, wherein said method further comprises periodically advancing the states of a group of said plurality of timers substantially simultaneously.

19. The at least one program storage device of claim 18, wherein the states of said group of timers comprise one of a row or a column in said array.

20. The at least one program storage device of claim 18, wherein said array is a multi-port array, and wherein said associating further comprises setting substantially simultaneously initial states for the associated timers of multiple data packets in said multi-port array via a plurality of array ports of the multi-port array.

21. The at least one program storage device of claim 18, wherein said array is a multi-port array, and wherein said providing further comprises obtaining substantially simultaneously the states for the associated timers of multiple data packets from said multi-port array via a plurality of array ports of the multi-port array.

22. The at least one program storage device of claim 18, wherein said array is a multi-port array, and said associating further comprises setting an initial state for said timer in said array via array ports of the multi-port array, and said providing further comprises obtaining the state of a timer associated with another data packet via the array ports of the multi-port array, and said periodically advancing further comprises obtaining the states of said group of said plurality of timers substantially simultaneously via the array ports, wherein when said setting, said providing, and said periodically advancing overlap in time, said setting and said providing have higher priority than said periodically advancing with respect to accessing the array ports of the multi-port array.

23. The at least one program storage device of claim 22, wherein said setting is responsive to a set-timer request made by said central queue, and said providing is responsive to a read-timer request made by said central queue.

24. The at least one program storage device of claim 23, wherein said periodically advancing further comprises advancing the states of a subgroup of timers of the group of timers when said set-timer request or said read-timer request concurrently accesses a timer in said group of timers, wherein the concurrently accessed timer is not advanced by said periodically advancing.

* * * * *